(12) United States Patent
Park

(10) Patent No.: US 6,702,440 B1
(45) Date of Patent: Mar. 9, 2004

(54) COUPLER FOR AUXILIARY LENSES

(76) Inventor: Young-Hwa Park, 103/707, Woobang-apt. 1271, lisan-dong, Suseong-gu, Daegu (KR)

( * ) Notice: Subject to any disclaimer, the term of this patent is extended or adjusted under 35 U.S.C. 154(b) by 0 days.

(21) Appl. No.: 10/383,645

(22) Filed: Mar. 10, 2003

(51) Int. Cl.$^7$ .......................... G02C 1/00; G02B 23/00
(52) U.S. Cl. ........................ 351/57; 351/47; 359/399
(58) Field of Search .................. 351/47, 57, 48, 351/58, 44, 41, 158; 359/399

(56) References Cited

U.S. PATENT DOCUMENTS

| | | | |
|---|---|---|---|
| 3,741,634 A | * 6/1973 | Stoltze | 351/57 |
| 4,810,081 A | * 3/1989 | Mapelli et al. | 351/57 |
| 4,886,340 A | * 12/1989 | Kanda | 359/411 |
| 6,485,143 B2 | * 11/2002 | Buettgenbach | 359/399 |

* cited by examiner

Primary Examiner—Hung X. Dang
(74) Attorney, Agent, or Firm—Birch, Stewart, Kolasch & Birch, LLP

(57) ABSTRACT

Disclosed is a coupler for auxiliary lenses for coupling auxiliary lenses to spectacles and allowing the auxiliary glassed to be out of user's sight when they are not needed. The coupler for auxiliary lenses comprises a coupling unit, an operation unit which is extended and retracted to be near and far from the coupling unit and is arranged to be pivoted upward on a pin when it is extended, and a sliding panel which is extended and retracted in the operation unit and has an end combined with and fixed to a bridge of the auxiliary lenses.

4 Claims, 10 Drawing Sheets

COUPLER FOR AUXILIARY LENSES

BACKGROUND OF THE INVENTION

1. Field of the Invention

The present invention relates to a coupler for auxiliary lenses, and more particularly to a coupler for auxiliary lenses, capable of detachably coupling auxiliary lenses to spectacles, or main glasses, and pivoting the auxiliary lenses so as for them to be out of a user's sight when they are not used.

2. Description of the Prior Art

Conventional auxiliary lenses having a sunglasses function are disclosed in Korean Utility Model No. 206,836, in which the auxiliary lenses are detachably coupled to spectacles so as for them to be able to be out of a user's sight without being detached or separated from the main glasses when they are not needed, for example, when a user drives into a tunnel. Referring to FIG. 13, a conventional coupler for conventional auxiliary lenses includes a coupling member 100, and upper and lower permanent magnets 102, 104 which are installed at the rear part of the coupling member 100 and opposite to each other by being installed at upper and lower portions of the coupling member 100, respectively. A vacant space is provided between the permanent magnets 102, 104 arranged at the rear part of the coupling member 100, and a holding space 112 is provided at the front part of the coupling member 100. The coupler further comprises a permanent magnet 106 inserted into a penetrating hole formed in a bridge 110 of spectacles or main glasses, in which the bridge 100 is provided between two glasses of the spectacles 108. The coupler is combined with the spectacles 108 in such a manner that the bridge 110 of the spectacles 108 is inserted into the vacant space of the coupling member 100 and the spectacles 108 and the coupling member 100 are secured to each other by a magnetic force caused between the permanent magnets 102, 104 installed in the coupling member 100, 104 and the permanent magnet 106 installed in the bridge 110 of the spectacles 108. On the other hand, a bridge 116 of the auxiliary lenses 114 is received in the holding space 112 of the coupling member 100, so that the auxiliary lenses 114 and the coupling member 100 are combined with each other.

In the conventional coupler for auxiliary lenses as described above, to make the bridge 110 of the spectacles 108 stable in the vacant space of the coupling member 100, the upper and lower surfaces of the bridge 110 of the spectacles 108 must be planar. Accordingly, the conventional coupler is disadvantageous in that a design modification of the spectacles 108 is limited and appearance of the spectacles 108 is not good when the auxiliary lenses 114 are separated from the spectacles since the permanent magnet 106 is exposed at the upper surface of the bridge 110. Further, when the auxiliary lenses are detached from the spectacles, since the permanent magnet 106 is visible at the upper surface of the spectacles, the spectacles may be recognized as those for combination use with auxiliary lenses, such that users are reluctant to wear the spectacles alone.

Further, when the auxiliary lenses are attached to the spectacles, since the holding space 112, in which the bridge 116 of the auxiliary lenses 116 is received and held, of the coupling member 100 is located above the bridge 110 of the spectacles 108, and the bridge 116 of the auxiliary lenses are arranged above two lenses of the auxiliary lenses, the coupling member 100 is clearly visible. Accordingly, the appearance of a user wearing the spectacles and the auxiliary lenses is not good. Further, when a user wears the auxiliary lenses, since the bridge of the auxiliary lenses is not located in the middle portion of the two glasses, the auxiliary lenses are unattractive to people who are familiar with glasses having a bridge at the middle portion thereof.

SUMMARY OF THE INVENTION

Therefore, the present invention has been made in view of the above problem, and it is an object of the present invention to provide a coupler for auxiliary lenses capable of satisfying the original function of a coupler itself, allowing a bridge of spectacles to be freely designed, allowing a bridge of auxiliary lenses to be located in the middle portion of glasses of the auxiliary lenses, and having a good appearance by not requiring an additional attaching member and minimizing exposure of the coupler when they are worn by a user.

In accordance with the present invention, the above and other objects can be accomplished by the provision of a coupler for auxiliary lenses comprising a coupling unit, an operation unit which is extended and retracted forward and backward to be far or near from the coupling unit and is arranged to be pivoted upward on a pin when it is extended, and a sliding panel which is extended and retracted forward and backward in the operation unit and has an end combined with and fixed to a bridge of the auxiliary lenses.

Preferably, the coupling unit may include a guide panel having a guide groove formed on an upper surface thereof for guiding a sliding movement of the operation unit, a pin installed to across the guide groove and coupled to guide rails formed at both side edges of the guide panel, and an opening and closing panel combined with the guide panel by a hinge member and defining a coupling space between the guide panel and itself, wherein an opening of the coupling space is closed by permanent magnets.

Preferably, the operation unit 12 may include a body received in the guide groove of the guide panel and slidable through a space defined by the pin and the upper surface of the guide groove, permanent magnets 32, 34 formed in the body, a hooking groove formed at a rear end portion of the body, a sliding groove formed at the lower surface of the body, guide rails formed at both side edges of the sliding groove, and protrusions formed at respective inside surfaces of the guide rails to define a guide path therebetween, wherein the rearmost surface and the bottom surface of the operation unit forms a sector shape.

Preferably, the sliding panel 16 may be made of metal, and include a body having a width determined by a width of the guide path of the operation unit and a guiding section formed at the rear end of the body and having a width determined by a width of the sliding groove.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Referring to FIGS. 1 to 12, a coupler for auxiliary lenses in accordance with the present invention will be described below.

Figure 1:
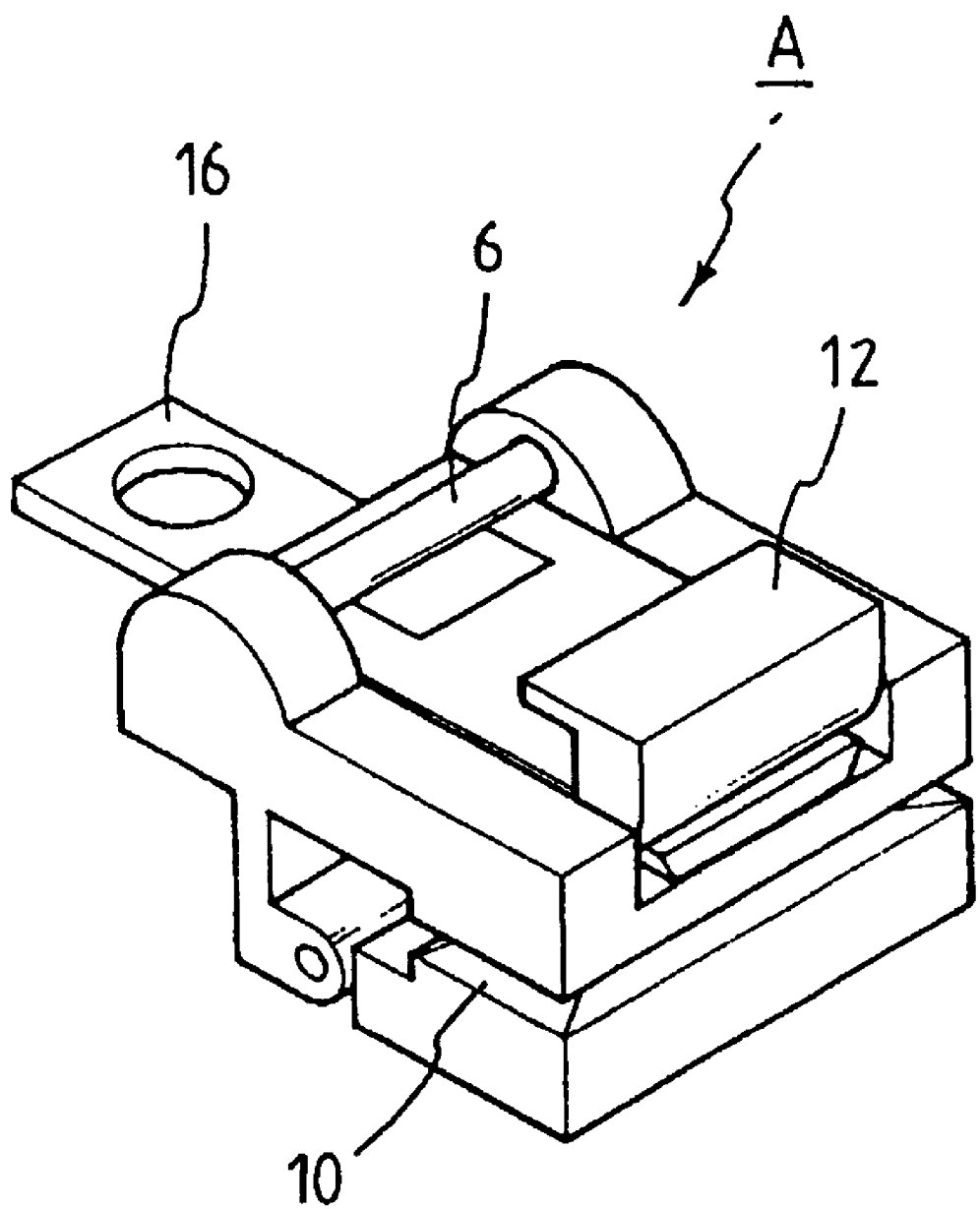
FIG. 1 is a perspective view of a coupler for auxiliary lenses in accordance with the present invention, wherein a sliding panel of the coupler is not extended.
Figure 2:
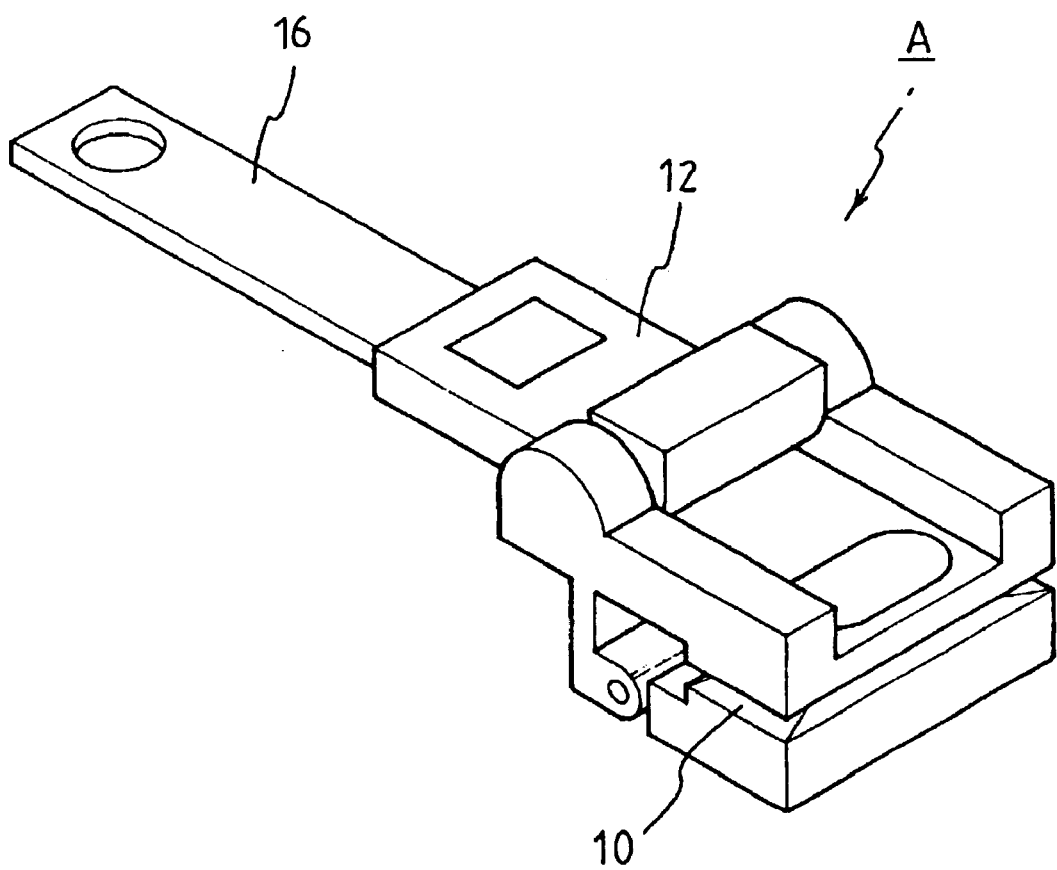
FIG. 2 is a perspective view of the coupler for auxiliary lenses in accordance with the present invention, wherein the sliding panel of the coupler is extended.
Figure 3:
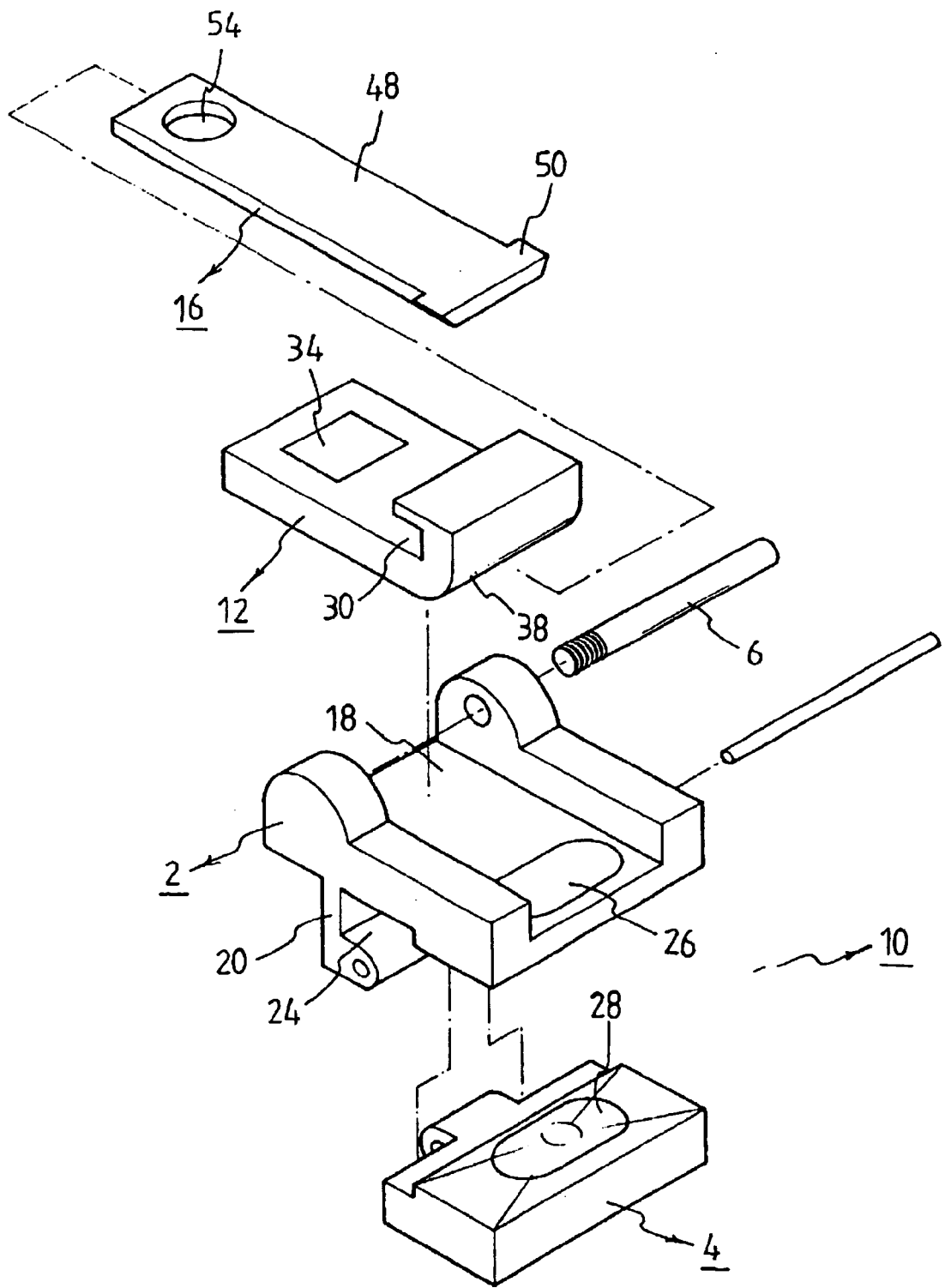
FIG. 3 is an exploded perspective view of the coupler for auxiliary lenses in accordance with the present invention, wherein the sliding panel of the coupler is not extended.
Figure 4:
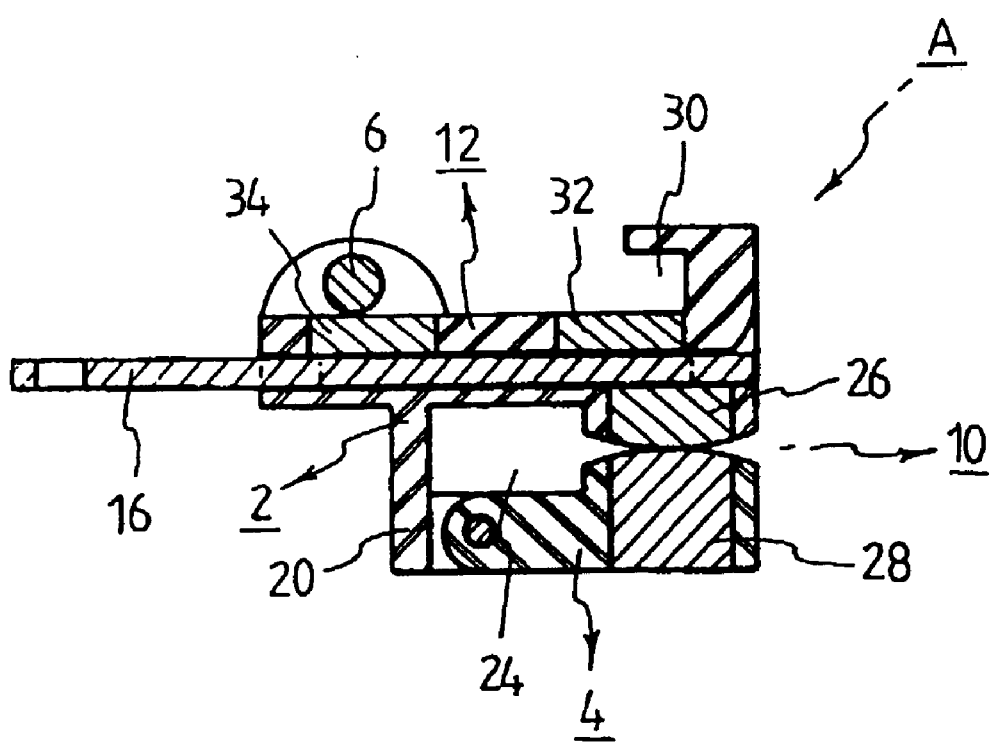
FIG. 4 is a cross-sectional view of the coupler for auxiliary lenses in accordance with the present invention, wherein the sliding panel of the coupler is not extended, and wherein the section is taken along a line IV—IV in FIG. 1.
Figure 5:
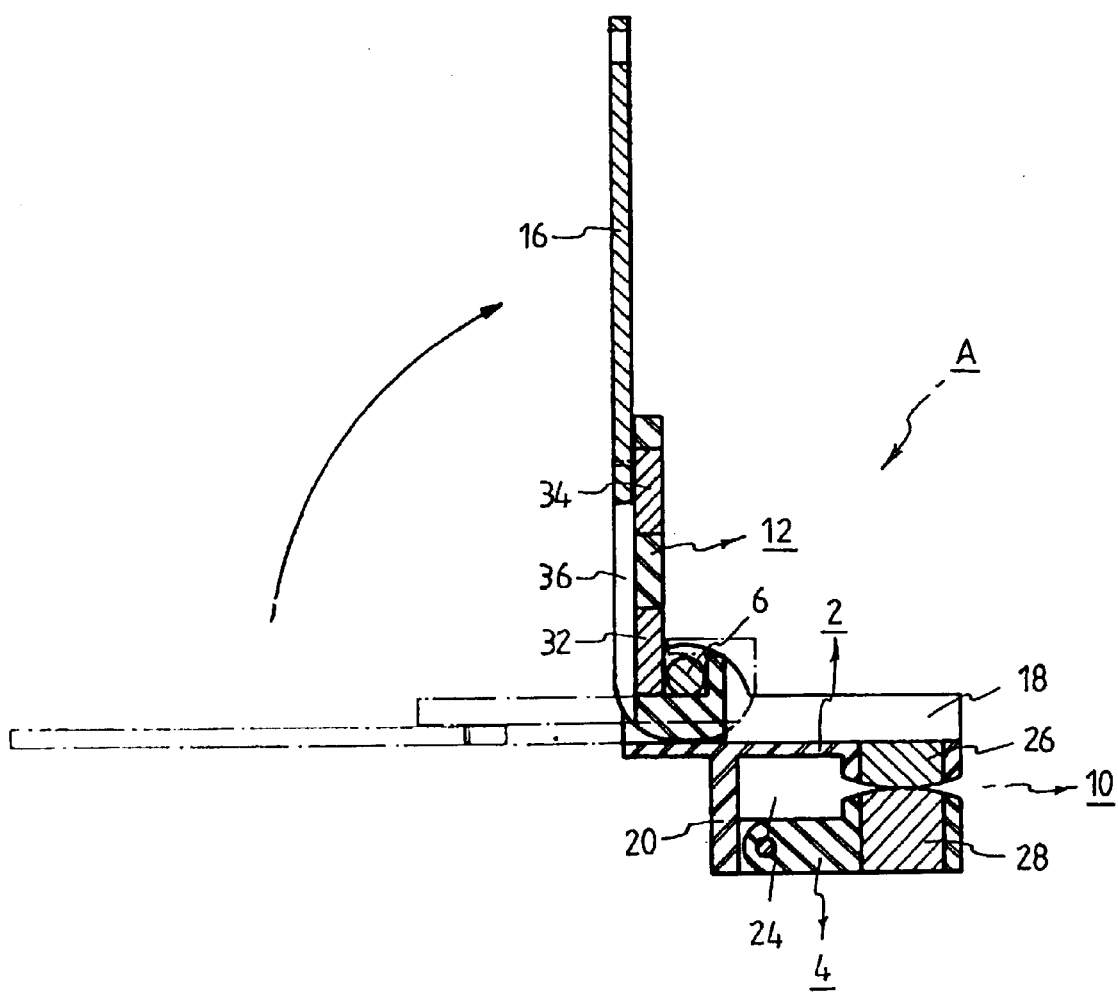
FIG. 5 is a cross-sectional view of the coupler for auxiliary lenses in accordance with the present invention, wherein the sliding panel of the coupler is extended, and wherein the section is taken along the line IV—IV in FIG. 1.

FIG. 3 is an exploded perspective view of a coupler for auxiliary lenses in accordance with the present invention. Referring to FIG. 3, a coupler for auxiliary lenses in accordance with the present invention comprises a coupling unit 10 to be combined with spectacles 8 and having a guide panel 2, an opening and closing panel 4, and a pin 6, an operation unit 12 sliding forward and backward along the surface of the guide panel 2 and pivoting upward on the pin 6 after it is fully extended, and a sliding panel 16 sliding along the surface of the operation unit 12. The sliding panel 6 has a rear end combined with a bridge of auxiliary lenses 14 and a front end combined the operation unit 12.

The guide panel 2 has a guide groove 18 formed on the upper surface thereof and extending from the rear end to the front end thereof. The pin 6 is detachably coupled to both side edges of the guide panel 2 across the guide groove 18 and is distanced from the upper surface of the guide groove 18 to provide a space therebetween, so that the operation unit 12 can be received in the space. The guide panel 2 has a coupled section 20 fixedly coupled to the lower surface of the guide panel 2, and the opening and closing panel 4 is coupled to a lower end portion of the coupled section 20 by a hinge member, so that a coupling space 24 is provided between the guide panel 2 and the opening and closing panel 4. The spectacles 8 may be received and held in the coupling space 24.

The guide panel 2 and the opening and closing panel 4 have respective permanent magnets 26, 28 at the corresponding rear portions thereof, in which the permanent magnets 26 and 28 face to each other, so that an opening portion of the coupling space 24 defined by the guide panel 2 and the opening and closing panel 4 is kept closed. Further, the permanent magnet 26 installed in the guide groove 18 of the guide panel 2 is exposed at both the upper and lower surfaces thereof.

In the coupling space 24, an elastic material is preferably coated on internal surfaces thereof, so that damage to the bridge 22 of spectacles 8 is prevented and the coupling space 24 can adapt to various designs of bridges 22 of the spectacles 8 when the bridge 22 of the spectacles 8 is inserted into the coupling space 24.

The operation unit 12 includes a body to be received in the guide groove 18 formed on the guide panel 2, and slidable forward and backward along the surface of the guide groove 18. The operation unit 12 further includes permanent magnets 34, 32 penetratingly installed in the body to be exposed both at the upper and lower surfaces of thereof. Further, the permanent magnets 34, 32 are arranged separately from each other at the front and rear portions of the body, respectively. The operation unit 12 still further includes a sliding groove 36 formed on the lower surface of the body so as for the sliding panel 16 to be slidable therein to be extended or retracted. The operation unit 12 still further includes a hooking groove 30 at a rear end portion thereof. The hooking groove 30 may be formed by folding the rear end portion of the body upward. The operation unit 12 has a guide surface of a sector shape at the rearmost part thereof.

Figure 6:
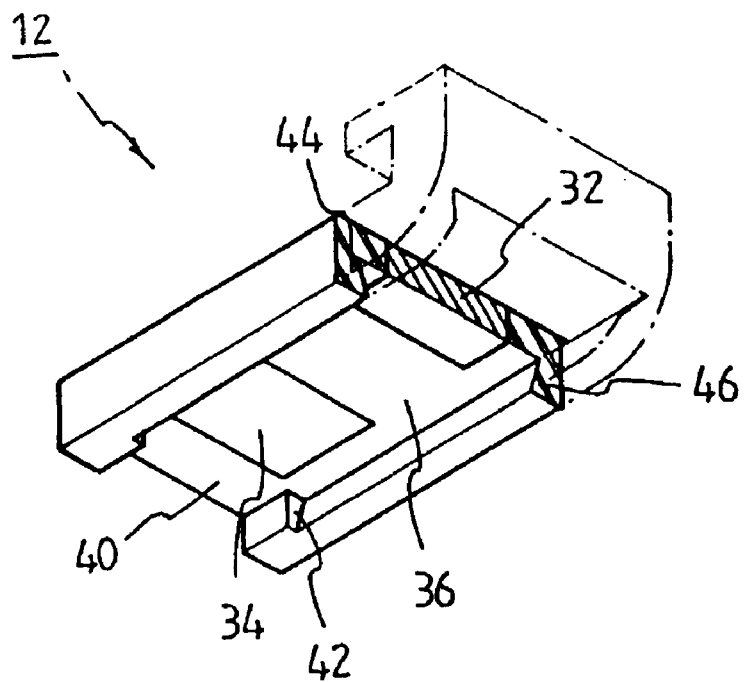
FIG. 6 is a partially cut out perspective view of an operation panel of the coupler for auxiliary lenses in accordance with the present invention.

FIG. 6 is partially cut out view of the operation unit 12. Referring to FIG. 6, the sliding groove 36 is longitudinally formed on the lower surface of the body of the operation unit 12 from the front end to the rear end thereof, and guide rails 44, 46 are formed at both side edges of the sliding groove 36 on the lower surface of the body. At the front part of the operation unit 12, protrusions 42 are provided at inside surfaces of the both guide rails 44, 46, respectively, and a guide path 40 is provided between the protrusions 40 in the sliding groove 36.

The sliding panel 16 may be made of metal. The sliding panel 16 includes a body 48 having a long bar shape and a width determined by a width of the guide path 40 of the operation unit 12, and a guiding section 50 formed at the rear end portion of the body 48. The guiding section 50 of the sliding panel 16 slides along the sliding groove 36 formed in the operation unit 12 while being guided by the guide rails 44, 46 formed at both side edges of the sliding groove 36, so that the rear end of the sliding panel 16 is aligned with the rear end of the operation unit 12 which it is retracted. The sliding panel 16 is fixedly coupled to the auxiliary lenses 14 at the front end of the body 18.

The sliding panel 16 further includes a connection device at the front part of the body 48 so as for the front end of the sliding panel 16 to be stably and securely fixed to the auxiliary lenses 14. In the case that the bridge 52 of the auxiliary lenses 14 is made of synthetic resin, the connection device is preferably a penetrating hole 54, and the bridge 52 of the auxiliary lenses 14 is coupled to the sliding panel 16 by being inserted into the penetrating hole 54. In such a case, the sliding panel 16 may be formed by an insert extrusion molding method.

Figure 7:
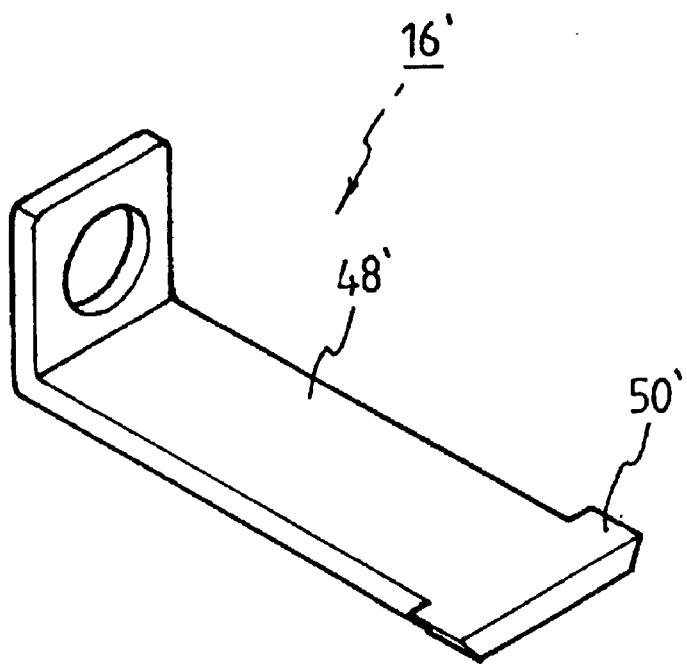
FIG. 7 is a perspective view of an alternative sliding panel of the coupler for auxiliary lenses in accordance with the present invention.

On the other hand, in the case that a thickness of the bridge 52 of the auxiliary lenses 14 is too thin, with reference to FIG. 7, the front end of the body 48' of the sliding panel 16' may be bent in a perpendicular direction to the body 48', and the penetrating hole is formed in the bent portion of the body 48'. In the case that the bridge 52 of the auxiliary lenses 14 is made of metal, the sliding panel 16' may be coupled to the bridge 52 of the auxiliary lenses 16 in such a manner that the bent portion of the body 48' is abutted to the back surface of the bridge 52 of the auxiliary lenses 14 and the bridge 52 and the bent portion are fixed together with a screw.

The coupler for auxiliary lenses in accordance with the present invention is assembled in such a manner that the sliding panel 16 is combined with the sliding groove 36 formed on the lower surface of the operation unit 12, the guiding section 50 of the guide panel 16 slides forward along the sliding groove 36 while being guided by the guide rails 44, 46, the operation unit 12 is received in the guide groove 18 formed on the upper surface of the guide panel 2 of the coupling unit 10, and the pin 6 is coupled to both side edges of the guide panel 2 to provide a space between the pin and the upper surface of the guide groove 18, so that the operation unit 12 and the sliding panel 16 may not be separated from the coupling unit 10 by the pin 6.

By adjusting a size of the coupling space 24 formed in the coupling unit 10, the coupler A may be combined with the various types of bridges of the spectacles, so that the bridges of the spectacles can be freely designed. Further, since an additional attaching element for combining the coupler A with the auxiliary lenses is not needed, the coupler A in accordance with the present invention provides a simple and good appearance to the spectacles.

Further, since the end of the sliding panel 16 is fixed to the bridge 52 of the auxiliary lenses 14, the coupler A and the auxiliary lenses 14 are handled together and the combination of the coupler and the auxiliary lenses 14 is attached to the spectacles when it is needed.

When the coupler A is attached to the spectacles 8, the opening and closing panel 4 used for closing the opening portion of the coupling space 24 and combined with the guide panel 2 by a hinge member is opened, the bridge 22 of the spectacles 8 is inserted into the coupling space 24, the opening portion of the coupling space 24 is closed by a magnetic force between the permanent magnets 26, 28, and the closed status of the opening portion of the coupling space 24 is maintained by the magnetic force of the permanent magnets 26, 28, so that the coupler and the spectacles are securely combined with each other.

Figure 8:
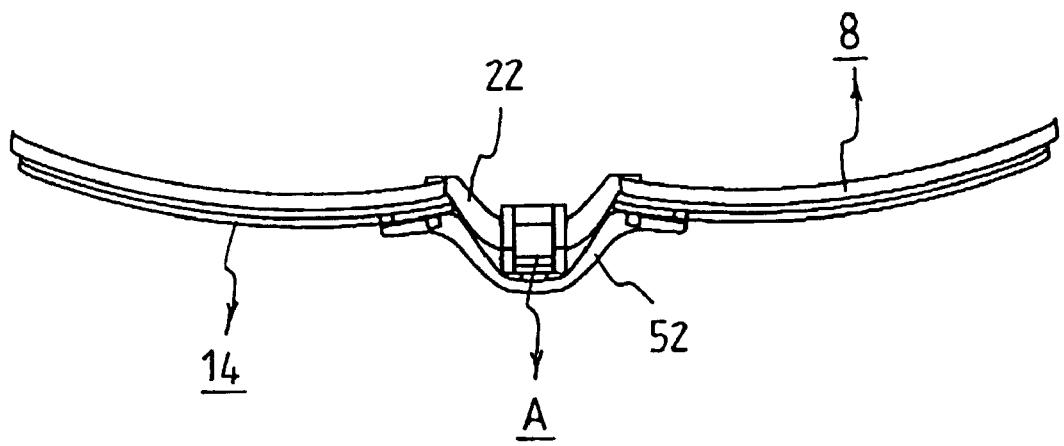
FIG. 8 is a plan view of the coupler for auxiliary lenses in accordance with the present invention, wherein a sliding panel is not extended.
Figure 9:
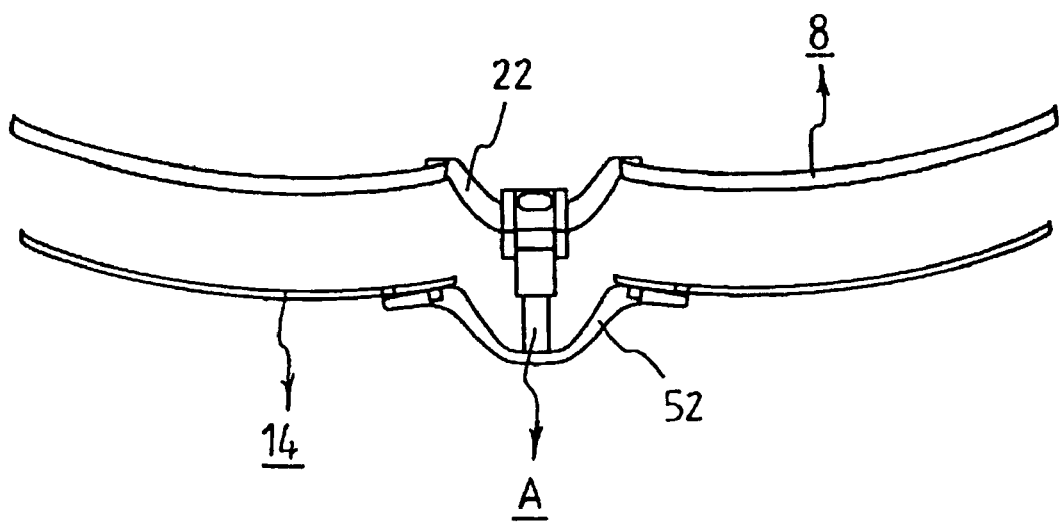
FIG. 9 is a plan view of the coupler for auxiliary lenses in accordance with the present invention, wherein the sliding panel is extended.
Figure 10:
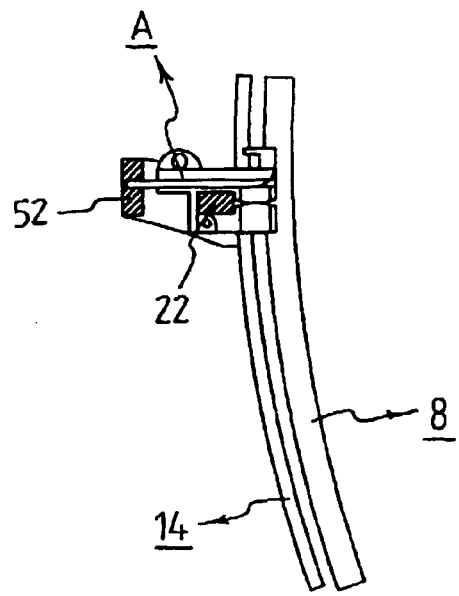
FIG. 10 is a side view of the coupler for auxiliary lenses in accordance with the present invention, wherein the sliding panel is not extended.
Figure 11:
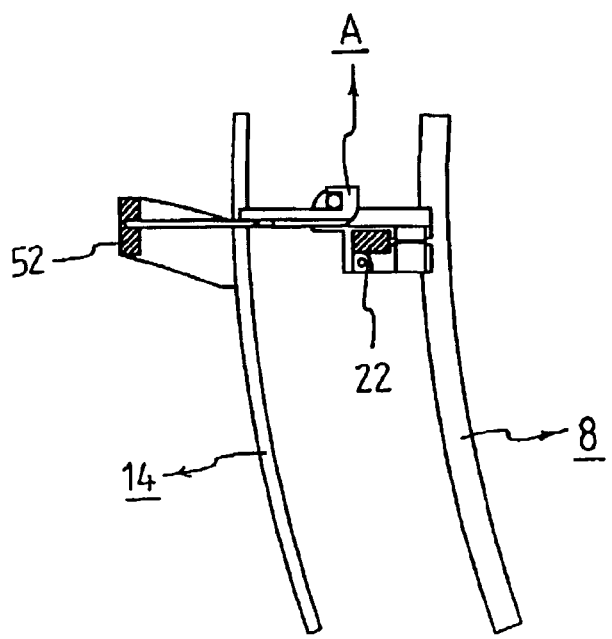
FIG. 11 is a side view of the coupler for auxiliary lenses in accordance with the present invention, wherein the sliding panel is extended.
Figure 12:
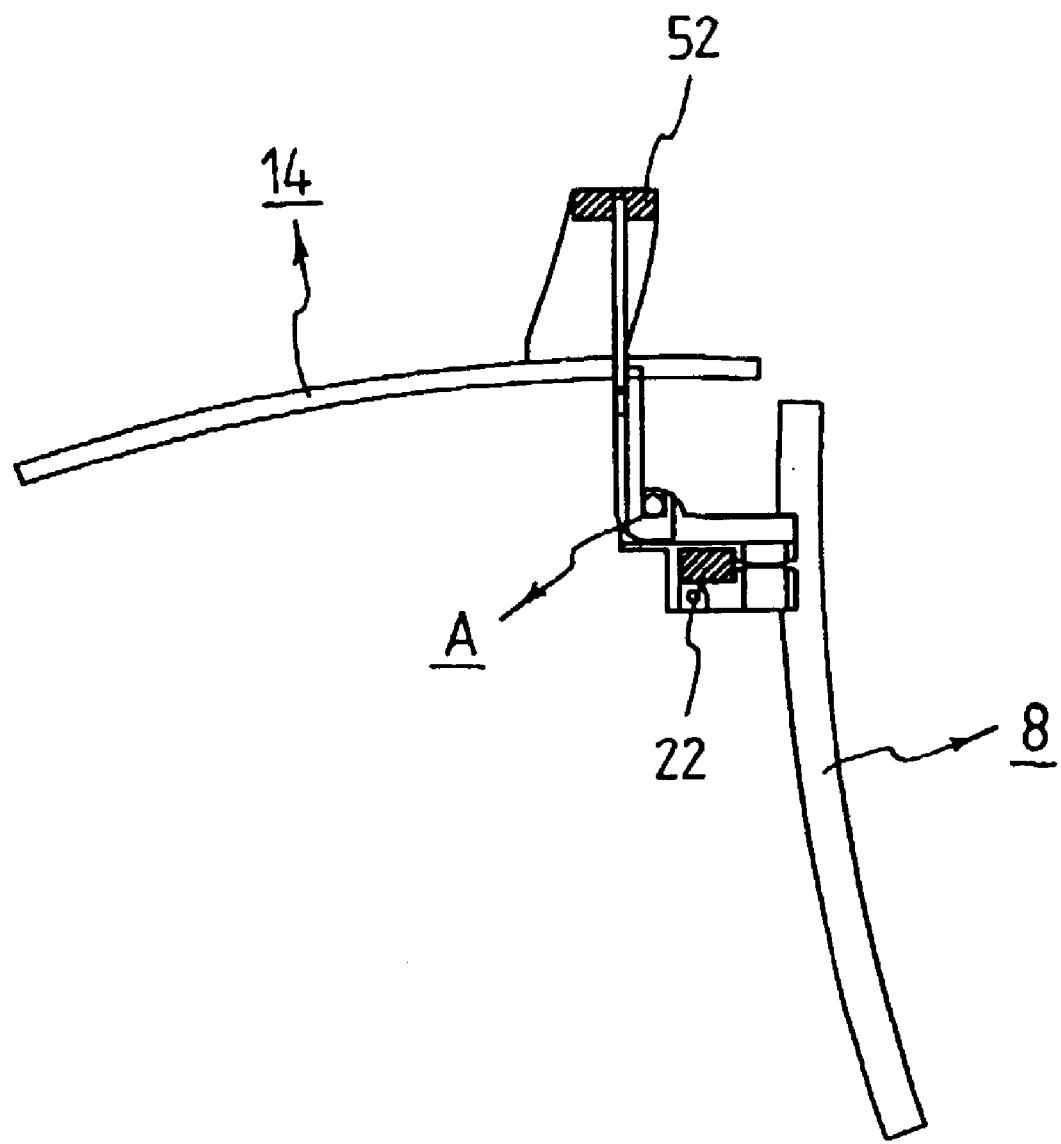
FIG. 12 is a side view of the coupler for auxiliary lenses in accordance with the present invention, wherein the sliding panel is pivoting.
Figure 13:
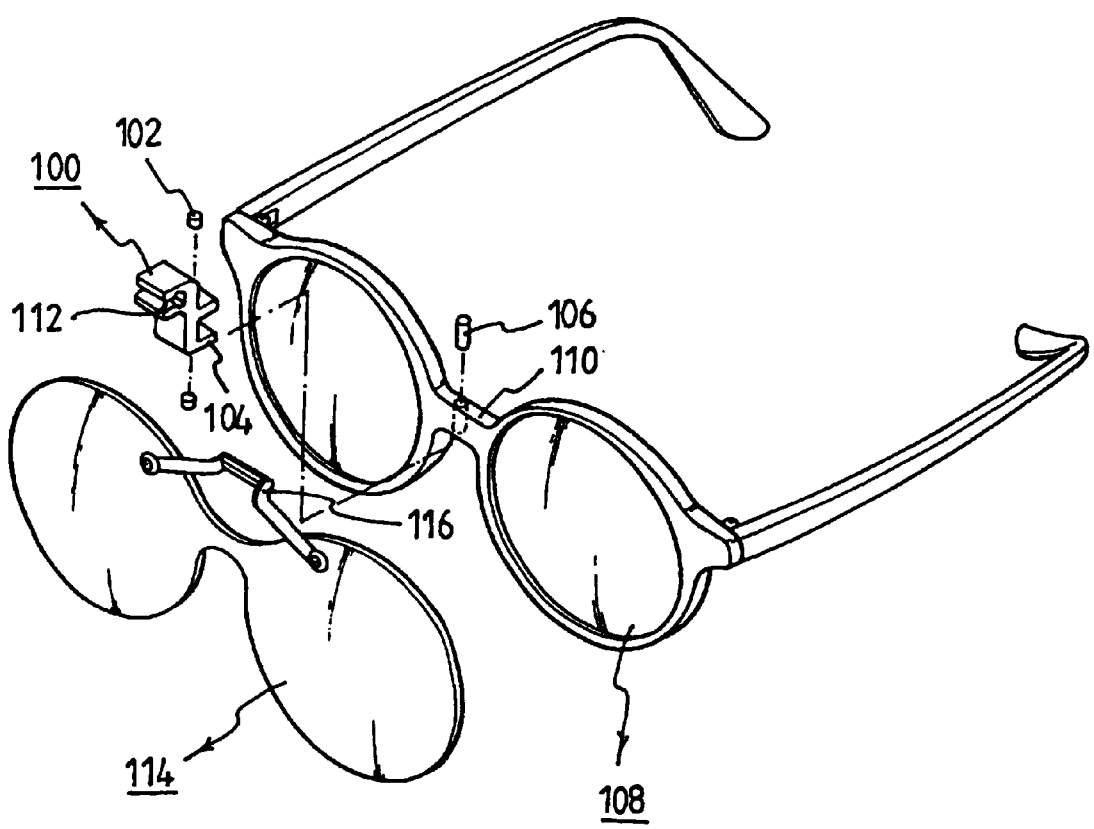
FIG. 13 is a perspective view of a coupler for auxiliary lenses in accordance with the prior art.

Referring to FIGS. 8 and 10, when the coupler is combined with the spectacles 8, the operation unit 12 is fully retracted, and the sliding panel 16 is fully retracted. In such a state, the auxiliary lenses 14 are positioned to be near the spectacles at the front part thereof so that they may intercept the sunlight. At this time, as long as an external force is not applied to the coupler, the sliding panel 16 made of metal is fixed at the fully retracted position by the magnetic force between the permanent magnets 32, 34, the operation unit 12 is fixed at the fully retracted position by the magnetic force of the permanent magnet 26 of the guide panel 2, so that the auxiliary lenses are kept closed and attached to the spectacles.

When a user puts on the auxiliary lenses 14 by using the coupler A in accordance with the present invention, the coupler A is positioned between the bridge 52 of the auxiliary lenses 14 and the bridge 22 of the spectacles 8, so that the coupler A is not seen by others. Further, the coupler A is located in the latitudinal middle portion of the auxiliary lenses, appearance of the auxiliary lenses 14 and the spectacles 8 is stable and good.

Further, when the auxiliary lenses 14 are attached to the spectacles but are not needed for a certain reason, for example, a user of the auxiliary lenses 14 drives into a tunnel or an interior of a building, the user may pull out the bridge 52 of the auxiliary lenses 14. At this time, the operation unit 12 is extended by sliding along the guide groove 18 of the guide panel 2 until the retraction of the rear end of the operation unit 12 is stopped by the pin 6. Further, at this time, the sliding panel 16 is retracted while being guided by the sliding groove 36 of the operation unit 12 until the retraction of the rear end of the sliding panel 16 is stopped by the protrusions 42 formed at the front portion of the operation unit 12.

A distance between the auxiliary lenses and the spectacles when the operation unit 12 and the sliding panel 16 are fully extended is determined by a length from the top of the auxiliary lenses to the bridge 52 of the auxiliary lenses 14, and the auxiliary lenses 14 are pivoted upward on the pin 6 after the operation unit 12 and the sliding panel 16 are fully extended. As a result, the auxiliary lenses 14 can be out of a user's sight without interfering with the spectacles 8. At this time, since the lower surface of the operation unit 12 is in contact with the surface of the guide groove 18 of the guide panel 2, the auxiliary lenses 14 are stably supported and the sliding panel 16 made of metal is kept extended due to a magnetic force of the permanent magnet 34 installed in the operation unit 12.

As apparent from the above description, the present invention provides a coupler for auxiliary lenses capable of performing the original function of a coupler itself, allowing a bridge of spectacles to be freely designed, allowing a bridge of auxiliary lenses to be located in the latitudinal middle portion of glasses of the auxiliary lenses, and having a good appearance by not requiring an additional attaching member for attaching the coupler to the spectacles and minimizing exposure thereof.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A coupler for auxiliary lenses comprising:

a coupling unit;

an operation unit which is extended and retracted forward and backward to be near or far from the coupling unit and is arranged to be pivoted upward on a pin 6 when it is extended; and a sliding panel which is extended and retracted forward and backward in the operation unit and has an end combined with and fixed to a bridge of the auxiliary lenses.

2. The coupler as set forth in claim 1, wherein the coupling unit includes:

a guide panel having a guide groove formed on an upper surface thereof for guiding a sliding movement of the operation unit 12;

a pin being across the guide groove and coupled to guide rails formed at both side edges of the guide panel; and an opening and closing panel combined with the guide panel by a hinge member and defining a coupling space between the guide panel and itself, wherein an opening of the coupling space is closed by permanent magnets.

3. The coupler as set forth in claim 1 or claim 2, wherein the operation unit 12 includes a body received in the guide groove of the guide pool and slidable through a space defined by the pin and the upper surface of the guide groove, permanent magnets 32, 34 formed in the body, a hooking groove formed at a rear end portion of the body, at sliding groove formed at the lower surface thereof, guide rails formed at both side edges of the sliding groove, protrusions formed at inside surfaces of the guide rails to define a guide path therebetween, and a guide surface having a sector shape along the back surface and the bottom surface thereof.

4. The coupler as set forth in claim 1, wherein the sliding panel 16 is made of metal, and wherein the sliding panel 16 includes a body having a width determined by a width of the guide path of the operation unit, and a guide section, formed at the rear end of the body and having a width determined by a width of the sliding groove.

* * * * *